United States Patent [19]

Stoker

[11] 4,062,305
[45] Dec. 13, 1977

[54] CROP INTERSEEDING IMPLEMENT

[76] Inventor: John F. Stoker, 101 O'Brien Road, Lee's Summit, Mo. 64063

[21] Appl. No.: 695,480

[22] Filed: June 14, 1976

[51] Int. Cl.² .............................................. A01C 5/06
[52] U.S. Cl. .......................................... 111/1; 111/14; 111/52; 111/81; 111/85; 172/517; 180/1 F; 180/25 R
[58] Field of Search .................. A01C/7/00; 172/292, 172/517, 276, 277; 180/1 F, 25–27 R; 111/1, 14, 52, 85, 81

[56] References Cited

U.S. PATENT DOCUMENTS

| | | | |
|---|---|---|---|
| 258,928 | 6/1882 | Keith | 111/85 X |
| 2,054,513 | 9/1936 | Kriegbaum et al. | 172/277 X |
| 2,530,053 | 11/1950 | Glass | 172/517 X |
| 2,619,361 | 11/1952 | Connors et al. | 180/1 F X |
| 2,785,762 | 3/1957 | Gahler | 180/27 |
| 2,822,216 | 2/1958 | Finley et al. | 180/26 R X |
| 3,964,565 | 6/1976 | Cagle et al. | 180/1 F X |

OTHER PUBLICATIONS

"With Interseeding Two Full Crops a Year" *Farm Journal*, Nov. 1975, p. 29.

Primary Examiner—Edgar S. Burr
Assistant Examiner—Steven A. Bratlie
Attorney, Agent, or Firm—Lowe, Kokjer, Kircher, Wharton & Bowman

[57] ABSTRACT

A self-propelled implement is specially constructed to plant seeds such as beans between rows of a tall growing crop such as wheat. The frame members of the implement are supported above the growing crop on top of selectively spaced front and rear wheel assemblies which are narrow enough to pass between the rows of the growing crop. Each wheel is entirely covered and is provided with a fender that tapers to an inclined forward edge to facilitate passage of the implement through the field. An engine which powers the implement also operates seeding mechanisms which are associated with the wheels.

3 Claims, 4 Drawing Figures

CROP INTERSEEDING IMPLEMENT

BACKGROUND AND SUMMARY OF THE INVENTION

This invention relates generally to agricultural equipment and deals more specifically with an implement that is used to interseed crops.

In recent years, the interseeding of crops has been carried out in areas where the climate is suitable for year round growing. Interseeding involves the planting of one crop (such as soybeans) prior to the harvesting of another crop (such as wheat, oats or barley) which is growing in the same field. This has advantages over double cropping in which the second crop is not planted until after the first crop has been harvested. The primary advantage of interseeding is that there is a period of overlap in the growing seasons of the crops so that each can be planted and harvested at the most desirable time of year to produce a top yield. Furthermore, double cropping is highly weather sensitive since its success depends largely on the presence of good weather conditions at the time of harvesting of one crop and seeding of the other. Weather dependence is substantially decreased in the interseeding method because the harvesting and planting of either crop may be delayed considerably without adversely affecting the yield.

Despite the recognized advantages of interseeding, it has not as yet been employed on a widespread basis, primarily because of the difficulty involved in planting soybeans in a growing wheat field. The various methods of interseeding that have been attempted have not proven to be particularly successful. Conventional planting equipment has been used for interseeding but has not been satisfactory because it physically damages the wheat or other tall growing crop. Various modifications to adapt existing equipment for use in interseeding have been proposed but have not been successful in eliminating the problem of damage to the growing crop. The known specialized interseeding equipment that has been developed has not eliminated this problem and has also been deficient in that it is unable to seed the beans in straight rows. Consequently, when the wheat is harvested, the harvesting equipment severely damages the beans.

It is an object of the present invention to provide an interseeding implement that serves to plant seeds in a field of growing wheat or other tall crop without damaging same. The implement embodying the invention is equipped with wheels that readily fit between adjacent crop rows and frame members that are elevated well above the crop so as not to physically contact the growing plants. In addition, the special fenders for the wheels taper to inclined forward edges that are able to easily separate overhanging wheat plants without causing damage thereto.

Another object of the invention is to provide an interseeding implement that plants the seed in straight rows which are spaced relatively widely and uniformly apart so as not to be damaged during subsequent harvesting of the wheat.

A further object of the invention is to provide an interseeding implement of the character described which includes means for adjusting the spacing between the wheels in accordance with the spacing between the rows of the growing crop.

An additional object of the invention is to provide an interseeding implement of the character described which is able to plant three rows of seeds at a time.

Yet another object of the invention is to provide a unique implement of the character described that is constructed simply and economically.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
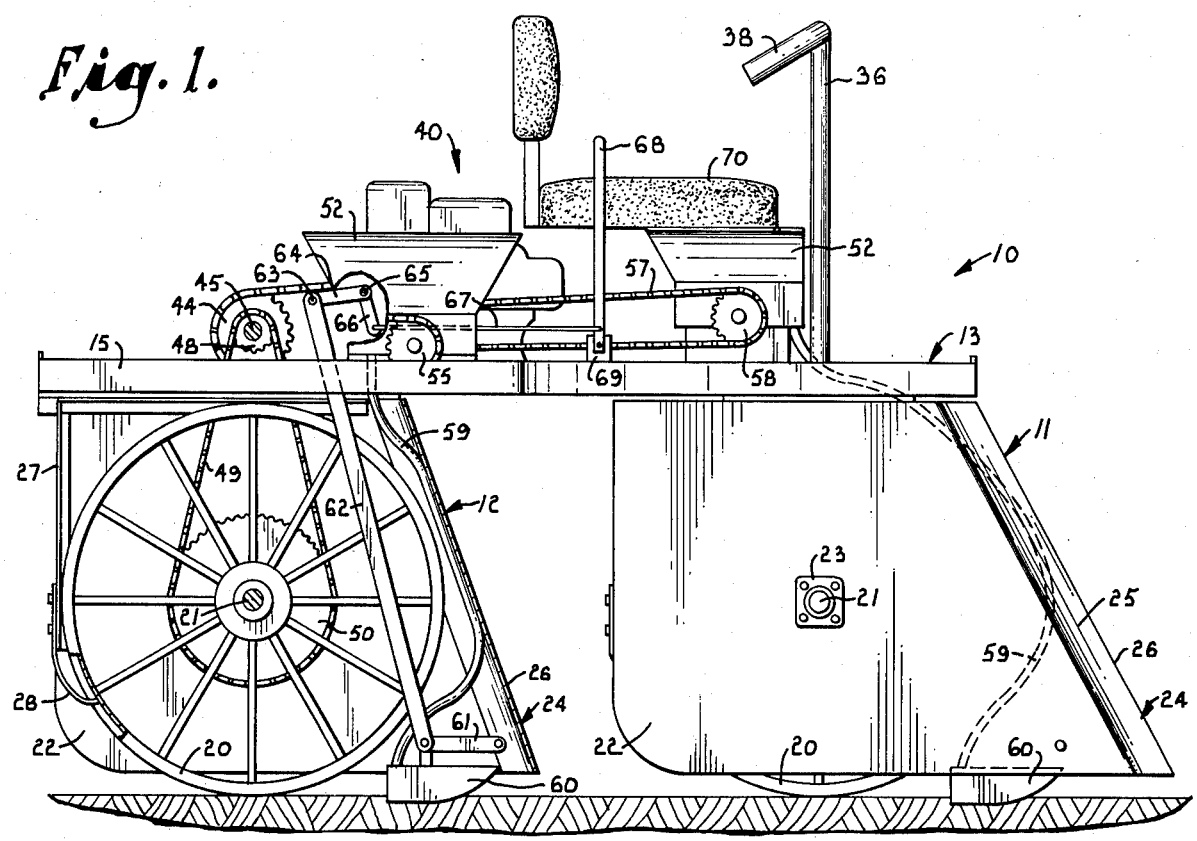
FIG. 1 is a side elevational view of a crop interseeding implement constructed according to a preferred embodiment of the invention, with portions broken away for illustration purposes.

Referring now to the drawings in detail, a crop interseeding implement constructed in accordance with the invention is generally designated by reference numeral 10. The implement 10 is specially constructed to plant a crop such as beans in a field in which wheat or another crop of substantial height such as oats or barley is already growing. The implement is equipped with a single front wheel assembly 11 and a pair of rear wheel assemblies 12. The wheel assemblies are the only parts of the implement that are located below the top of the growing crop, and each wheel assembly 11 and 12 is narrow enough to readily fit between adjacent rows of the growing wheat crop.

A frame 13 is located on top of the front and rear wheel assemblies 11 and 12 to interconnect them. The frame includes a rear angle member 14 and a pair of side angle members 15 which extend forwardly from the opposite ends of member 14. Side members 15 are parallel to one another at their rearward portions and are bent inwardly such that their forward portions converge as they extend forwardly. The forward ends of members 15 are spaced apart and are interconnected by a short front angle section 16. The frame further includes a cross member 17 which extends between the parallel portions of members 15 and a plurality of forward cross members 18 which extend between the converging portions of members 15. The entirety of frame 13 is elevated at a height to pass well above the growing crop.

Figure 2:
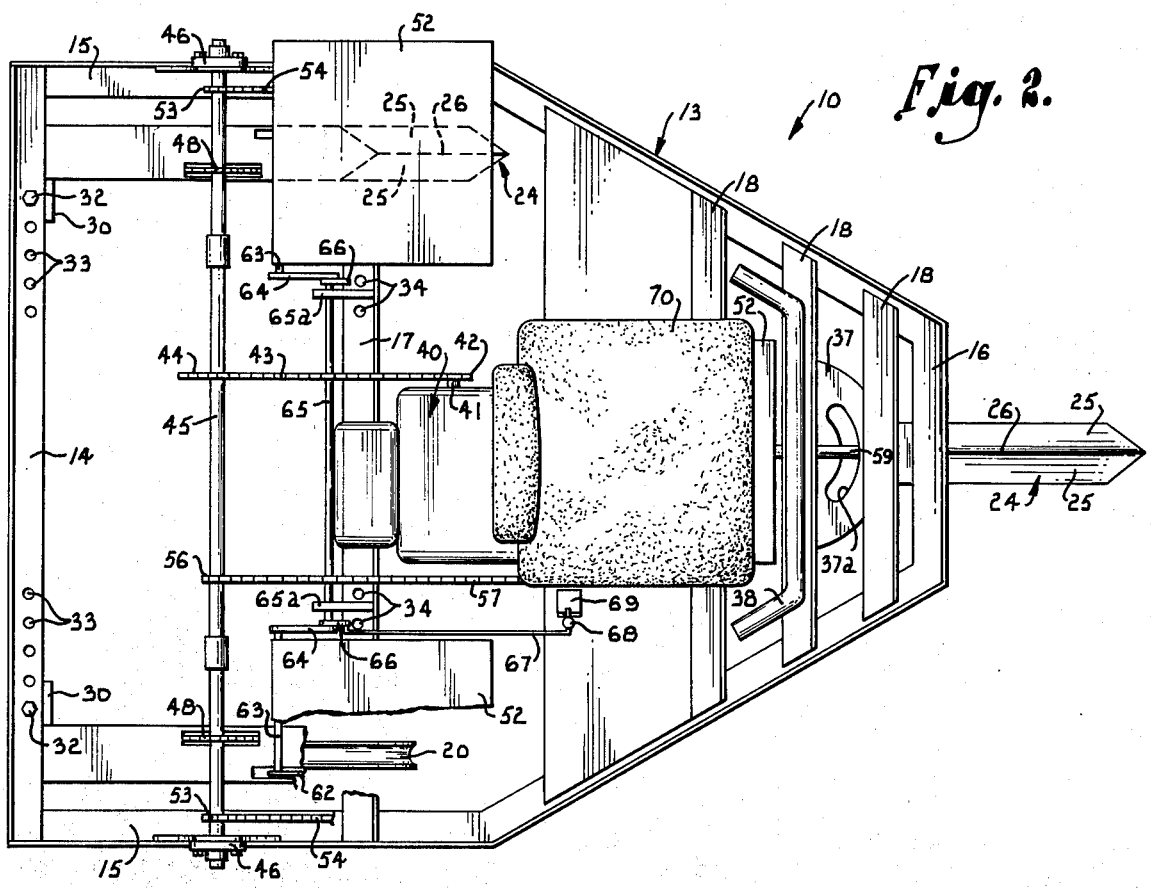
FIG. 2 is a top plan view of the implement shown in FIG. 1, wich portions broken away for illustrative purposes.

The front wheel assembly 11 and the two rear wheel assemblies 12 are constructed substantially identically. Each includes a narrow, large diameter wheel 20 which has a cup shaped periphery. Each wheel 20 is mounted on an axle 21 which is supported between a pair of side plates 22 that cover the opposite sides of the wheels. The cover plates 22 in each pair are spaced apart from one another a distance less than the distance between adjacent rows of the growing crop, as best shown in FIG. 2. Mounting plates 23 which are bolted to plates 22 support axles 21 for rotation.

The forward edge of each side plate 22 is inclined to the rear from bottom to top. A fender 24 is secured to forward edges of each pair of side plates 22. The fenders 24 are each inclined at the same angle as the side plate edges to which they are mounted. Each fender 24 includes a pair of metal fender strips 25 which extend generally forwardly and inwardly from the forward edges of side plates 22. The strips 25 in each pair angle toward one another and intersect with one another at an angle to thereby form a forward edge 26 which is likewise inclined to the rear from bottom to top.

Each wheel assembly further includes a back panel 27 (FIG. 3) which substantially covers the rearward portion of each wheel 20. The panels 27 are secured to the rearward edges of side plates 22, and each back panel is equipped with a curved tongue member 28 which projects into the cupped periphery of the corresponding wheel 20. Each wheel is substantially completely enclosed within the side plates 22, fender 24, and the back panel 27. Wheat and similar crops are commonly planted in rows that are seven inches apart.

Accordingly, the distance between the side plates 22 of each wheel assembly is considerably less than seven inches, preferably approximately 4 or 5 inches.

Figure 3:
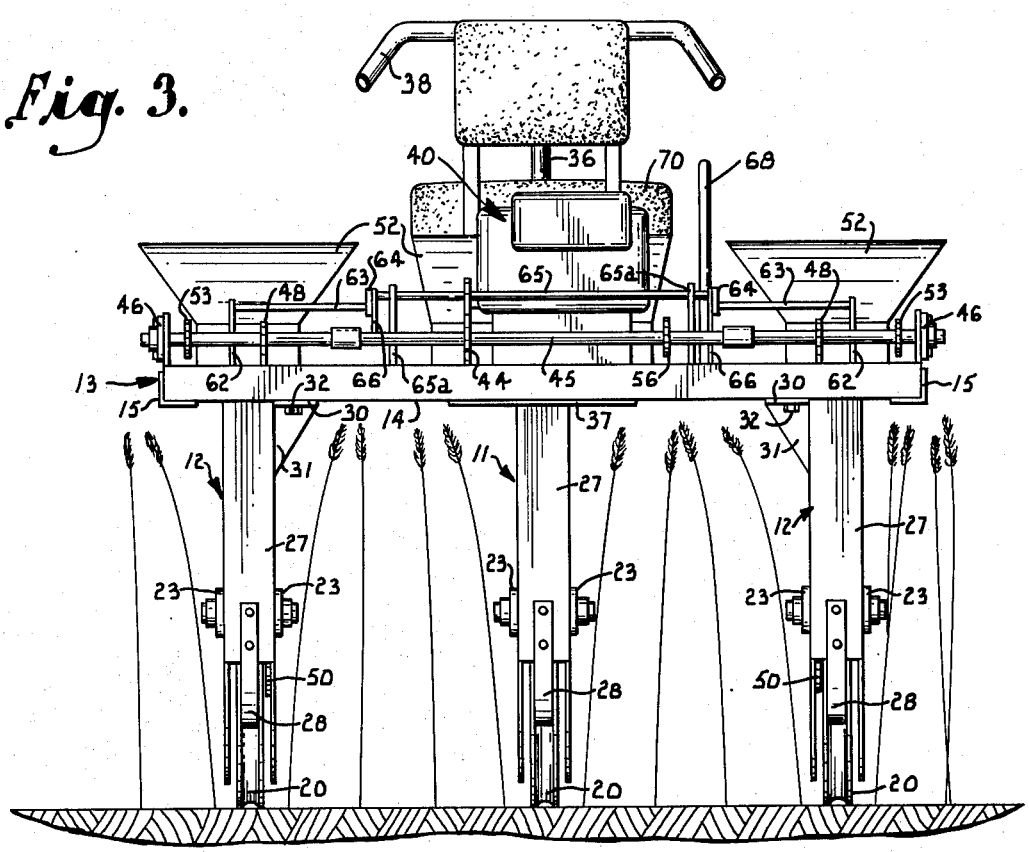
FIG. 3 is a rear elevatonal view of the implement shown in FIGS. 1 and 2, illustrating diagrammatically the implement travelling through a wheat field.

As previously indicated, the framework 13 is supported on top of the wheel assemblies 11 and 12. With particular reference to FIG. 3, a pair of mounting plates 30 which are each reinforced by gussets 31 are secured to project inwardly from each rear wheel assembly 12 at the front and rear portions thereof. The rear plate 30 of each wheel assembly 12 is secured to the rear frame member 14 by a nut and bolt assembly 32. In a similar manner, the forward mounting plate 30 of each wheel assembly 12 is secured to the cross member 17 by a nut and bolt assembly (not shown). As shown in FIG. 2, each member 14 and 17 is provided with a plurality of bolt holes 33 and 34, respectively, so that the rear wheel assemblies may be bolted in various lateral spatial arrangements relative to one another and to the longitudinal center line of the implement. Ordinarily, the rear wheel assemblies 12 will be spaced 56 inches apart (or eight wheat rows apart with the wheat rows spaced seven inches apart), as will be explained in more detail. Wheel assemblies 11 and 12 are of sufficient height to space frame 13 at least 36 inches above the ground, which is greater than the height of the wheat or other growing crop at the time of interseeding.

For steering of the implement, the front wheel assembly 11 is mounted to turn relative to the frame 13. An upright bar 36 (FIG. 1) is rigid at its lower end with a circular plate 37 which is secured to the top portion of wheel assembly 11 and which is able to rotate relative to the frame of the implement. Bar 36 is provided with a steering handle 38 at its top end which may be turned to pivot the wheel assembly 11 about the vertical axis of bar 36 in order to turn the implement. Wheel assembly 11 is located on the longitudinal center line of the implement and is midway between the rear wheel assemblies 12, or 28 inches from each in the preferred spatial relationship noted previously.

The implement is powered by a conventional internal combustion engine 40 which is mounted on member 17. With particular reference to FIG. 2, an output shaft 41 of the engine carries a sprocket 42 around which a chain 43 is drawn. Chain 43 is trained around a large sprocket 44 which is mounted on a cross shaft 45. Bearing supports 46 on the opposite side members 15 support shaft 45 for rotation.

Each rear wheel 20 is driven from shaft 45. Directly above each rear axle 21, a sprocket 48 is mounted on shaft 45. With reference now to FIG. 1, each sprocket 48 receives a chain 49 which is drawn around a large sprocket 50 mounted on the corresponding rear axle 21. It is contemplated that instead of the rear wheel drive, the front wheel of the implement may be driven.

Seed boxes 52 are mounted above the respective wheel assemblies. Sprockets 53 (FIG. 2) on shaft 45 receive chains 54 which are drawn around sprockets 55 (FIG. 1) associated with the rear seed boxes 52. Another sprocket 56 (FIG. 2) on shaft 45 receives a chain 57 which is trained around a sprocket 58 (FIG. 1) that operates the forward seed box. The seed boxs 52 are provided with a conventional seeding mechanism (not shown) which is operated from the associated driven sprocket 55 or 58 to discharge seeds from boxes 52 into seeding tubes 59. Each tube 59 extends to a sharp runner 60 which is adapted to make a furrow and deposit the seeds in the soil. Runners 60 are located directly in front of wheels 20 and are constructed with sharp edges so as to disturb only enough soil to insure germination while leaving the surrounding subsoil moisture unexposed to evaporation. An arcuate slot 37a (FIG. 2) is formed through plate 37 to receive the front tube 59 and to accommodate movement of plate 37 during turning of the front wheel.

The runners 60 are adjustable as to the extent to which they penetrate the ground. As shown in FIG. 1, each runner is pivoted to a link 61 and at the same point to an elongate lever 62. The forward end of link 61 is pivoted between the side plates 22, while the top end of lever 62 connects with a rod 63. The opposite end of rod 63 is connected with the rearward end of a lever 64, the forward end of which connects to one end of a cross shaft 65. The cross shaft 65 is mounted to pivot on supports 65a. A lever 66 extends below shaft 65 and receives the rearward end of a rod 67. The forward end of rod 67 connects with an upright hand lever 68 which is mounted to an upstanding lug 69 of the frame. The linkage between lever 68 and the two rearward runners 60 permits the runners to be raised and lowered upon appropriate manipulation of the hand lever 68, which is conveniently accessible from a drivers seat 70 mounted on the frame.

It is contemplated that conventional attachments for applying fertilizer, insecticide, herbicide and the like to the field will be installed on the implement if desired.

Figure 4:
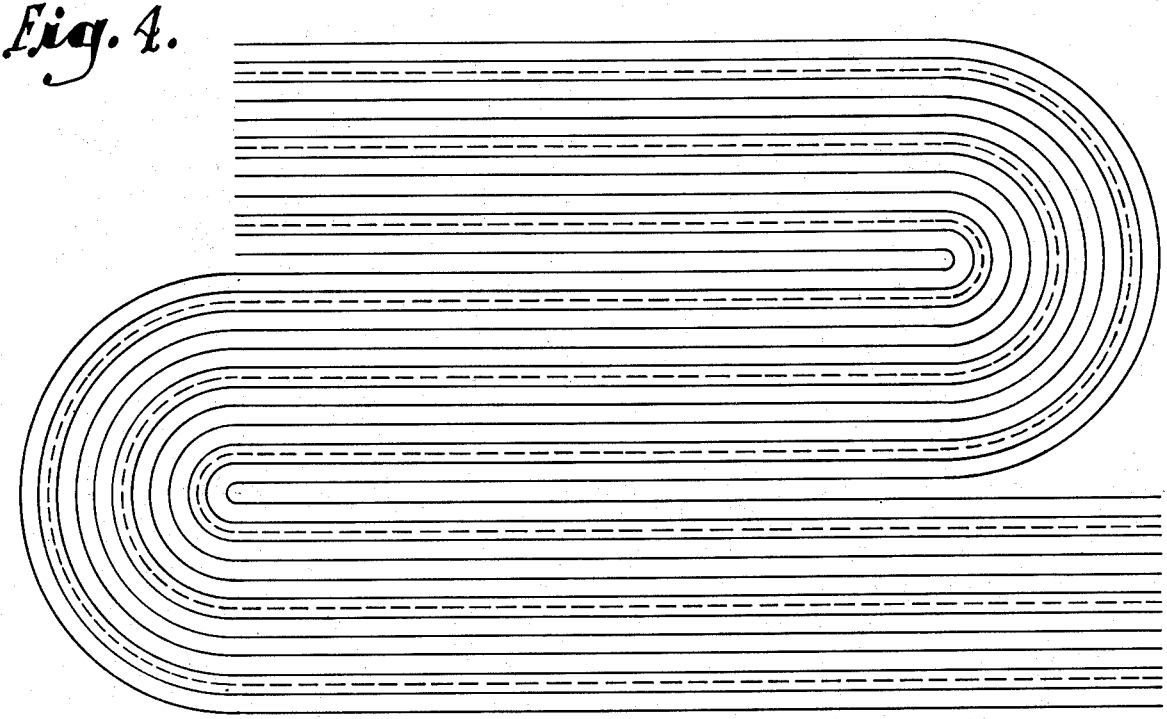
FIG. 4 is a schematic plan view illustrating the path taken by the implement when interseeding with the solid lines indicating rows of the growing crop and the broken lines indicating the path of the wheels of the implement.

In use, the implement is driven through a field of growing wheat or similar tall crop in order to interseed beans or other seeds in the field. The wheat is commonly planted in rows that are seven inches apart, and the wheel assemblies 11 and 12 are spaced 28 inches apart laterally, as previously indicated. Therefore, the wheels 20 of the implement are located four wheat rows apart from one another, as best shown in FIGS. 3 and 4. As the implement is driven with each wheel assembly 11 and 12 moving in a straight path between wheat rows, the runners 60 and the associated seeding components plant the bean seeds in straight rows that extend between the wheat rows. In this manner, three rows of beans are simultaneously interseeded in straight rows for each pass of the implement through the field, with one row of beans for every four rows of wheat.

FIG. 4 illustrates schematically the preferred path taken by the implement during interseeding. When the implement reaches the end of the field, it is turned rather sharply through 180° for the next pass, with the rear wheel which is inside on the turn moving over four wheat rows so as to maintain the desired spacing of the bean rows throughout the field.

It is again pointed out that the wheel assemblies 11 and 12 are the only parts of the implement that are low enough to possibly contact the wheat plants, and that the wheel assemblies are narrow enough to pass between adjacent rows of wheat without trampling or otherwise damaging it. This is best illustrated in FIG. 3. Fenders 24 lead the wheels, and the tapering of each fender to a forward edge 26 assures that any wheat plants that may overhang one another from adjacent rows will be spread apart without damage. The inclined nature of fenders 24 and edges 26 is also important in this regard because the overhanging plants are able to ride gradually up the inclined edges without damage until they are eventually spread sufficiently to accommodate passage of the wheels. The substantially complete enclosing of the wheels 20 shields them from contact with the growing plants so that they will not trample or become tangled therewith.

The implement is readily adaptable for interseeding between crop rows having various spacings, since adjustment of the spacing between the wheels is provided by the bolt holes 33 and 34. The adjustability of the wheels is further important because of the importance of planting the interseeded crop in precisely located rows in order to prevent subsequent damage and to facilitate harvesting of each crop.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A self-propelled interseeding implement for planting seeds such as beans between closely spaced rows of a growing crop of small grain such as wheat which has a substantial height, said implement comprising:

a plurality of ground support wheel assemblies each including a ground engaging support wheel having a cup shaped periphery for compacting soil about the planted seeds, said ground support wheel assemblies being spaced apart with each being narrow enough to pass between adjacent rows of the growing crop of small grain;

a fender for each ground support wheel assembly supported forwardly of same, said fenders being arranged to substantially enclose said wheel assemblies and to pass between adjacent rows of the growing crop of small grain in a manner to separate overlapping plants in adjacent rows of the growing crop of small grain;

a frame supported on and interconnecting said wheel assemblies, said frame being elevated above the growing crop to pass thereover;

an engine mounted on said frame and drivingly coupled to at least one of said wheel assemblies to propel said implement; at least one of said wheel assemblies being used for steering;

at least one sharp planting runner supported on said frame and operable to penetrate the ground at a location to form a narrow furrow forwardly of each cup shaped wheel and between adjacent rows of the growing crop; and means for depositing seeds in said furrows fowardly of said ground engaging support wheels, whereby said ground engaging support wheels subsequently compact the soil about the seeds planted in said furrows.

2. An implement as set forth in claim 1, wherein each fender includes a pair of flat fender surfaces which intersect at an angle to form a leading edge located substantially centrally with respect to the width of the wheel assembly.

3. An implement as set forth in claim 1, wherein said wheel assemblies comprise a pair of laterally spaced rear wheel assemblies and a front wheel assembly.

* * * * *